(12) United States Patent
Sakai et al.

(10) Patent No.: US 6,414,809 B1
(45) Date of Patent: Jul. 2, 2002

(54) DATA STORAGE DEVICE SERVO CONTROL APPARATUS AND METHOD

(75) Inventors: Tatsuya Sakai, Yamato; Akira Tokizono; Naoyuki Kagami, both of Fujisawa; Takashi Kuroda, Yamato, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/412,890

(22) Filed: Jan. 5, 1999

(30) Foreign Application Priority Data

Oct. 29, 1998 (JP) .............................. 10-308218

(51) Int. Cl.[7] .............................. G11B 15/04; G11B 5/09
(52) U.S. Cl. .......................... 360/60; 360/77.08; 360/53; 360/31; 360/25
(58) Field of Search ................................ 360/60, 77.08, 360/53, 31, 25, 75, 69, 78.04, 78.14

(56) References Cited

U.S. PATENT DOCUMENTS

| | | | | |
|---|---|---|---|---|
| 5,126,895 A | * | 6/1992 | Yasuda et al. | 360/77.07 |
| 6,078,452 A | * | 6/2000 | Kittilson et al. | 360/51 |
| 6,111,714 A | * | 8/2000 | Ueda et al. | 360/60 |
| 6,226,140 B1 | * | 5/2001 | Serrano et al. | 360/60 |

OTHER PUBLICATIONS

US Pending Patent Application Ser. No. 09/133,464, T. Sakai et al., "Disk Drive, Servo Control Unit, And Control Unit"; filed Aug. 13, 1998 (Japanese Patent Application No. 9-218641).

* cited by examiner

*Primary Examiner*—David Hudspeth
*Assistant Examiner*—Dan I. Davidson
(74) *Attorney, Agent, or Firm*—Randell J. Bluestone; Bracewell & Patterson, L.L.P.

(57) ABSTRACT

A storage device with a disk-shaped recording medium having servo areas in which servo sectors are recorded and data areas in which data sectors are recorded; a read/write head to read and write the data sectors, and to read the servo sectors on the disk-shaped recording medium; a head actuator to control the position of the read/write head; a storage controller to control data sector read and write operations by the read/write head; a servo controller to determine a position of the read/write head from the servo sector output read by the read/write head; a servo assist unit, separate from the storage controller, to calculate servo data for controlling the head actuator based on position information extracted by the servo controller and read/write head; and an interrupt generator to generate interrupt requests to the storage controller as determined by results of calculations by the servo assist unit.

16 Claims, 15 Drawing Sheets

FIG. 9

| MPES | SPES | MPES+SPES | MPES : SPES | CUR_POS FORMULA | CUR_CYL FORMULA ODD CYLID | CUR_CYL FORMULA EVEN CYLID |
|---|---|---|---|---|---|---|
| >80 | ≥80 | >100 | > | SPES−80 | CYLID+1 | CYLID+0 |
| >80 | >80 | >100 | ≤ | −MPES | CYLID+1 | CYLID+0 |
| ≤80 | >80 | >100 | < | −MPES | CYLID−1 | CYLID+0 |
| <80 | >80 | ≤100 | < | −SPES+80 | CYLID−1 | CYLID+0 |
| <80 | ≤80 | <100 | < | −SPES−80 | CYLID+0 | CYLID+1 |
| <80 | <80 | <100 | ≥ | MPES | CYLID+0 | CYLID+1 |
| ≥80 | <80 | <100 | > | MPES | CYLID+0 | CYLID−1 |
| >80 | <80 | ≥100 | > | SPES+80 | CYLID+0 | CYLID−1 |

FIG.12
| Tr<br>O/E | n-1<br>ODD | n<br>EVEN | n+1<br>ODD | n+1<br>EVEN | |
|---|---|---|---|---|---|
| (a) | | ⊢▸ | | ⊢▸ | CUR POS = SPES − 80 |
| (b) | | ⊢▸ | | | CUR POS = −MPES |
| (c) | | ⊢▸ | | | CUR POS = −MPES |
| (d) | | ⊢▸ | | | CUR POS = −SPES + 80 |
| (e) | | | ⊢▸ | | CUR POS = −SPES − 80 |
| (f) | | | ⊢▸ | | CUR POS = MPES |
| (g) | | | ⊢▸ | | CUR POS = MPES |
| (h) | ⊢▸ | | ⊢▸ | | CUR POS = SPES + 80 |
FIG.13
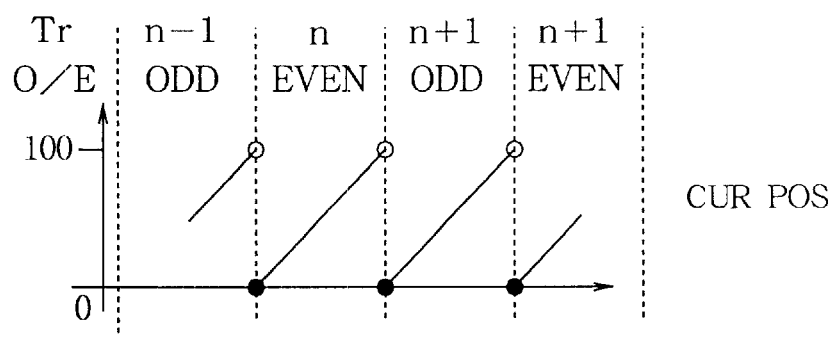
FIG.14
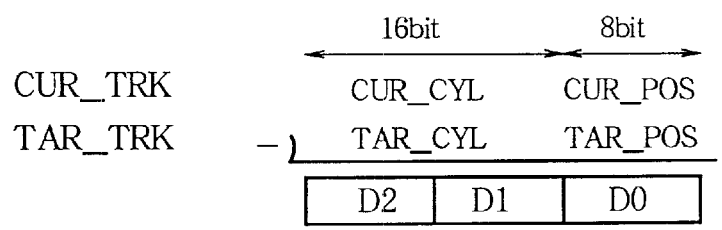

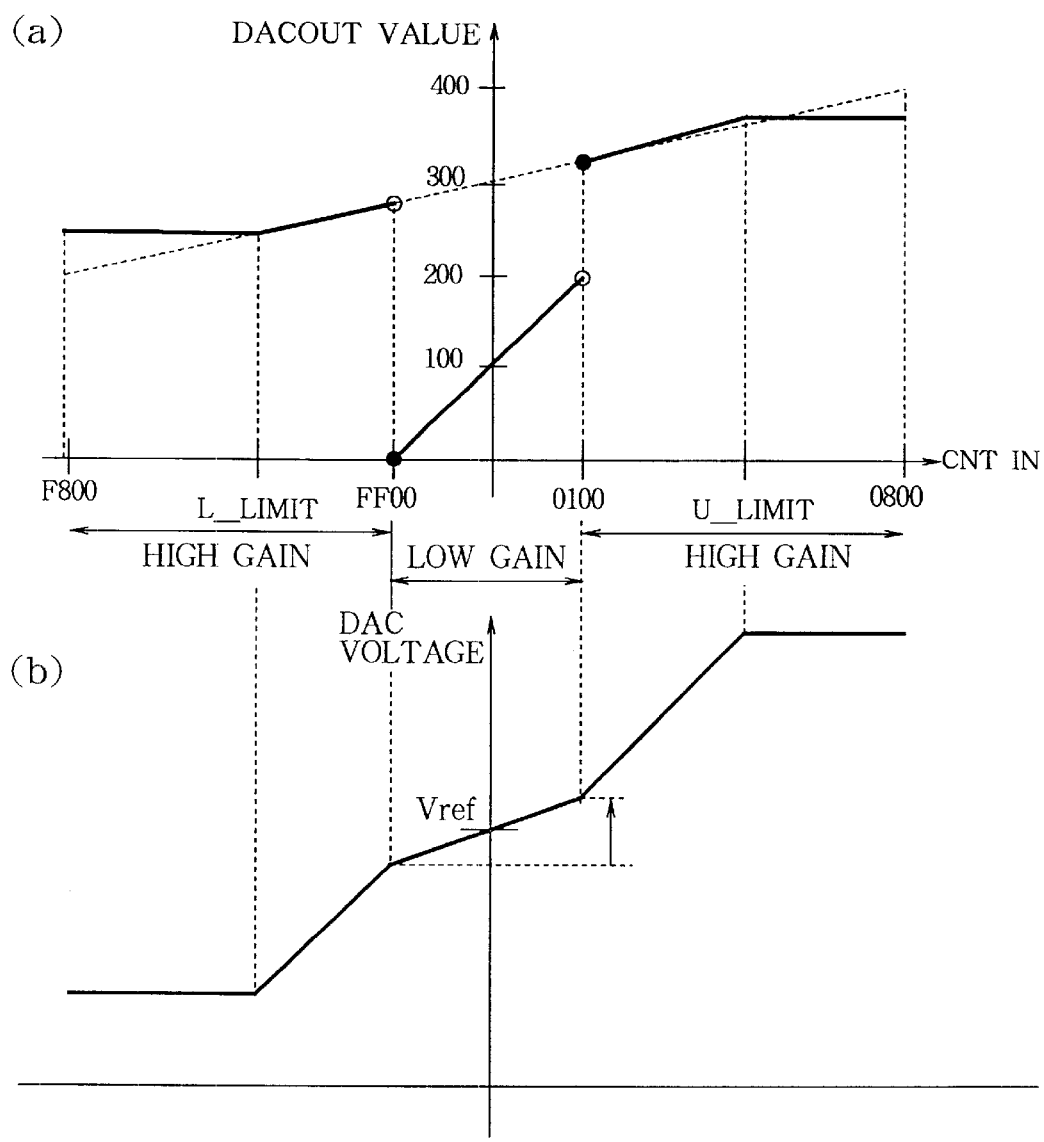

DATA STORAGE DEVICE SERVO CONTROL APPARATUS AND METHOD

BACKGROUND OF THE INVENTION

1. Field of the Invention

The present invention relates to the control of data storage devices, and more particularly to a system for processing servo control signals.

2. Prior Art

As shown in FIG. 2, concentric recording tracks X2 are formed on the recording surface of a magnetic disk X1 used as a recording medium in a disk drive device. Servo areas X3, in which servo sectors including a servo pattern, an ID, and the like are recorded, are provided at certain angular intervals (for example, 360°/80) in the recording tracks X2, and data areas X4, in which data sectors X5 are recorded, are provided between adjacent servo areas X3. In some disk drive devices of this type, these data areas X4 are divided into several areas (zones) in the radial direction, and the number of data sectors X5 recorded in each zone is made responsive to the radial position to produce a more uniform recording density.

In these disk drive devices, when a sector is specified for a read or write operation, seek control is performed to move a head X6 to the track in which the sector to be read or written to is located (the target track); after the head X6 has reached the target track, track following control is carried out to adjust the position of the head X6 so that the head X6 follows the track, and the specified sector is read or written.

As shown in FIG. 3, a servo pattern (WEDGE-A, WEDGE-B, WEDGE-C, WEDGE-D) and an ID (CYLID) are recorded in the above-mentioned servo area X3; when the head X6 passes over these servo patterns, the reproduced outputs of the servo pattern and ID, reproduced by the head X6, are supplied to an HDC X9. When supplied with these reproduced outputs, the HDC X9 determines from them the current position of the head X6, and finds the error (positional error) with respect to the target track. From the positional error, the HDC X9 also determines data (servo data) for driving a voice coil motor (VCM) X8 that moves a head arm X7.

In seek control, the HDC X9 determines the difference between the current position of the head X6 and the position of the target sector (the positional error), and carries out control responsive to this positional error. When a target track is designated, the HDC X9 first executes control to accelerate the head X6 toward the target sector. Next, when the velocity of motion of the head X6 reaches a certain velocity, the HDC X9 executes control to move the head X6 at a constant velocity. Finally, when the head X6 reaches the vicinity of the target sector, control (settling control) is executed to decelerate the head X6.

When the head X6 reaches the target track, the HDC X9 switches over to track-following control to make the head X6 follow the target track. These control switchovers are carried out by changing parameters of the calculations that determine the servo data.

An MPU is provided in the HDC X9 to execute input and output control of data with an external device, error processing, and the like. To reduce costs, having the MPU execute all of the above-described servo control, including seek control, following control, and the like, could be considered. With this configuration, however, attempts to enhance operating speed and accuracy in servo control would increase the MPU's control load, and this would limit attainable speed and accuracy.

If a DSP or another MPU is provided separately from the MPU to enhance the speed and accuracy of servo control, this DSP or other MPU will generally have functions not required for servo control, so it will unnecessarily increase the cost of the device.

The inventors of the present invention have therefore proposed, in Japanese Patent Application No. 9-218641 filed previously, a disk drive device provided with a hardware sequencer (SA: Servo Assist), separate from the MPU, that executes calculations for determining servo data based on the reproduced output of servo sectors and the like.

Providing a servo assist separate from the MPU reduces the processing load of the MPU, and provides advanced servo control without unduly increasing the processing load of the MPU.

In the disk drive device of the previous application, however, the servo assist itself was specialized for servo data calculations, so it could not decide whether to execute exception processing for recording/reproduction inhibition at so-called off-track times, or for errors and the like; so when each servo sector was reproduced, the servo assist generated an MPU interrupt to have the MPU decide whether or not to execute exception processing.

Therefore, if the magnetic disk X1 rotation speed is increased for a purpose such as enhancing the speed of reading and writing, or if the number of servo areas X3 is increased for a purpose such as enhancing the accuracy of servo control, servo sectors are reproduced more frequently, the frequency of interrupts increases, and the processing overhead for deciding about exception processing becomes large in relation to the total processing of the MPU.

The MPU processing capability assigned to input/output control of data with an external device, or to error processing and the like, is thereby diminished, and the performance of the disk drive device is impaired.

SUMMARY OF THE INVENTION

An object of the present invention, is to provide a servo control system that reduces the MPU processing load improves storage device performance.

To solve the problems described above, a storage device according an embodiment of the present invention comprises a disk-shaped recording medium having servo areas in which servo sectors are recorded and data areas in which data sectors are recorded; a read/write head to read and write the data sectors, and to read the servo sectors on the disk-shaped recording medium; a head actuator to control the position of the read/write head; a storage controller to control data sector read and write operations by the read/write head; a servo controller to determine a position of the read/write head from the servo sector output read by the read/write head; a servo assist unit, separate from the storage controller, to calculate servo data for controlling the head actuator based on position information extracted by the servo controller and read/write head; and an interrupt generator to generate interrupt requests to the storage controller as determined by results of the servo assist unit computations.

At least the controller, the servo assist unit, and the interrupt generator may be formed as a single semiconductor device. The interrupt generator may set an operating mode responsive to the position information detected by the servo controller, and may select whether to generate an interrupt request to the storage controller when each servo sector is read, or to generate interrupt requests to the storage controller based on the results of the servo assist unit computations, depending upon the operating mode.

BRIEF DESCRIPTION OF THE DRAWINGS

FIG. 9 illustrates a table used in the calculation of a position error signal in a disk drive device according to an embodiment of the present invention.

FIG. 12 illustrates the relationship between the position of the head in the track width direction and the formulas used to calculate the current position.

FIG. 13 illustrates variations in the position of the head in the track width direction and the current position.

FIG. 14 illustrates a calculation of track distance.

FIG. 19 illustrates gain adjustment and limiting of the DAC driving voltage.

FIG. 20 illustrates a method of determining the DACOUT interval.

DETAILED DESCRIPTION OF THE PREFERRED EMBODIMENTS

Figure 1:
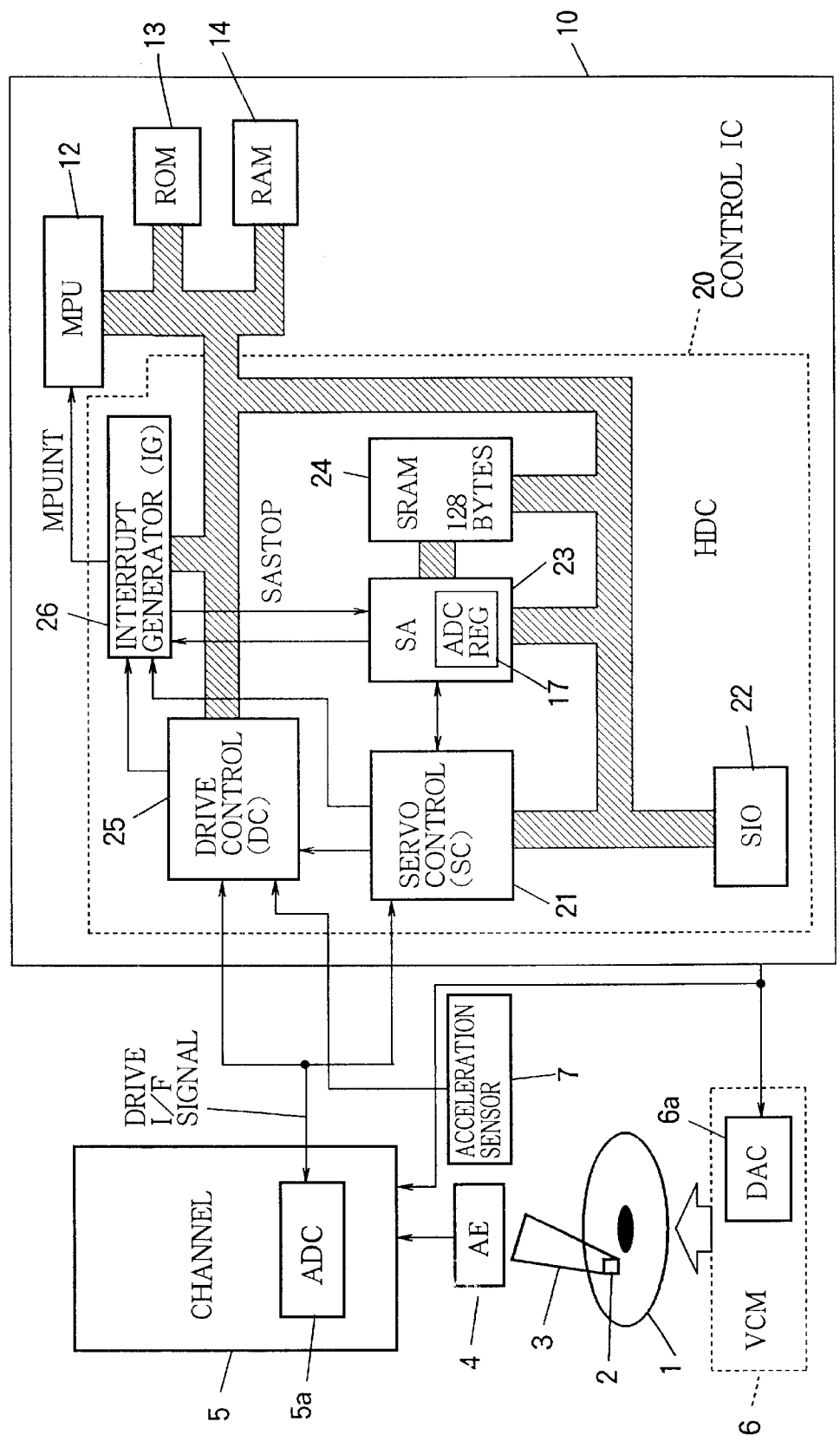
FIG. 1 illustrates a block diagram of a disk drive device according to an embodiment of the present invention.

FIG. 1 illustrates a block diagram of a disk drive device according to an embodiment of the present invention. This disk drive device comprises: a magnetic disk 1; a head 2 (transducer) for carrying out reading and writing on the magnetic disk 1; a head arm 3 to which head 2 is attached; an arm electronics circuit (AE) 4 disposed near head 2 that supplies recording signals to head 2 and amplifies the read signals of head 2; a channel 5 that extracts servo patterns, cylinder IDs (CYLIDs), and the like from the read signals supplied through this AE 4, and performs coding system conversion etc.; a control IC (control device) 10 that carries out servo control, control of reading and writing on the magnetic disk 1, etc.; a head actuator shown as a VCM driving unit 6 that drives a voice coil motor (VCM) to move the head arm 3; and an acceleration sensor 7 that senses acceleration applied to the disk drive device.

Control IC 10, which may comprise a single semiconductor device, includes an HDC (hard disk controller) 20 that generates servo signals and the like, an MPU (storage controller) 12 that controls the operation of the entire device, a ROM 13 which stores control programs etc., and a RAM 14 to store control data, read/write data, etc.

Figure 2:
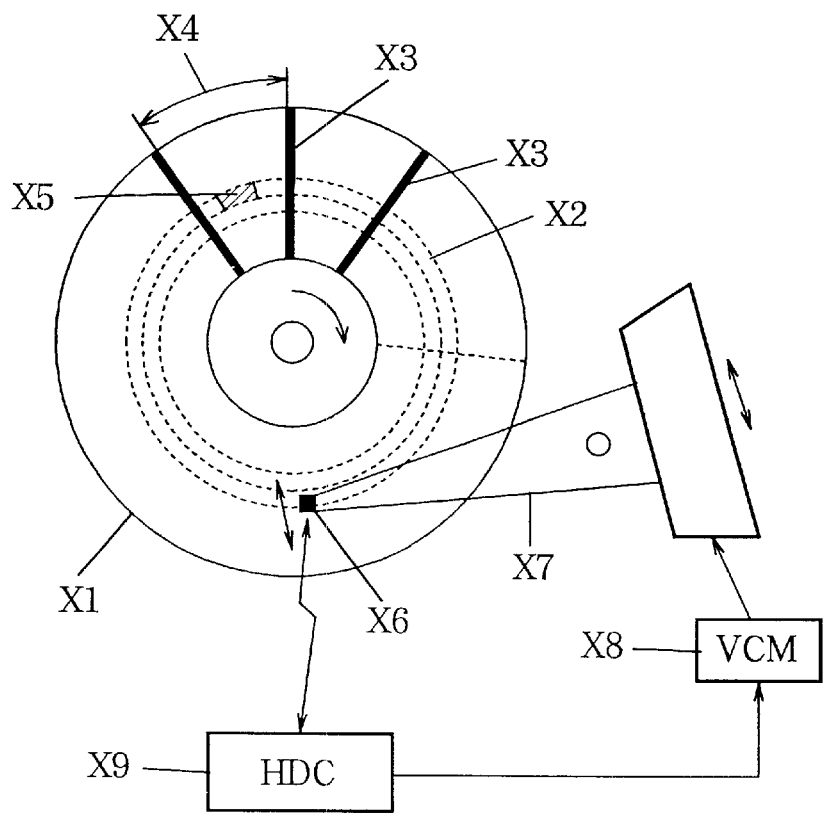
FIG. 2 illustrates a block diagram of a conventional disk drive device.

Tracks X2, as shown in FIG. 2, with a certain width are formed concentrically on the recording surface of the magnetic disk 1. Servo areas are provided at regular angular intervals (for example, 360°/80) on the recording surface, and servo patterns X3 are recorded in these servo areas. Data sectors X5 are recorded in the areas (data areas) X4 between adjacent servo patterns X3 on each track X2. The recording density may be made more uniform by dividing the data areas X4 into several areas (zones) in the radial direction, and recording a number of data sectors X5 responsive to the radial position in each zone.

Figure 3:
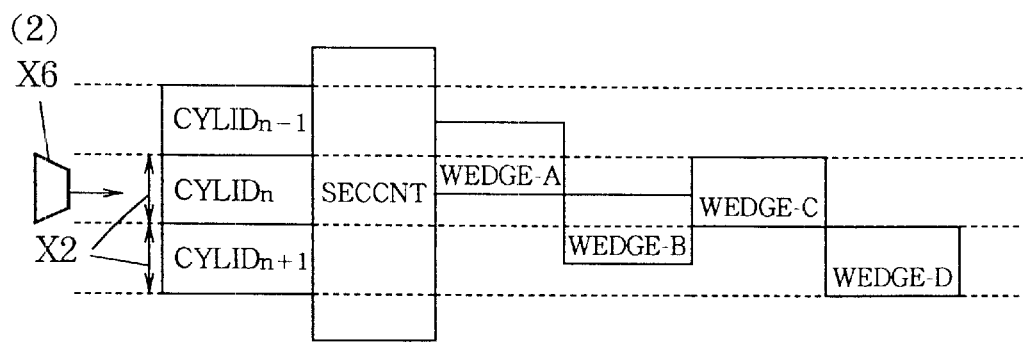
FIG. 3 illustrates an example of a servo sector format employed in the conventional disk drive device.

As in FIG. 3, a cylinder ID (CYLID) indicating a track number, a physical sector number (SECCNT) indicating the number of the servo pattern, burst patterns (WEDGE-A, WEDGE-B, WEDGE-C, WEDGE-D) for tracking (following) control, and the like are recorded in each servo sector X3, each coded in a coding system suitable for the reading and writing thereof.

The CYLID is recorded in a special notation referred to as a Gray code. Differing from ordinary binary notation, this notation is defined so that, each time the value increases by one, only one location in the bit pattern changes. With this notation, even if the head jumps between cylinders n and n−1, the value of one cylinder or the other is obtained. SECCNT is a number for distinguishing individual servo patterns; this number does not change with changing position in the radial direction, so it is recorded in binary form. The channel 5 reproduces the CYLID and SECCNT values by decoding them according to their coding, and supplies them to the control IC 10.

The burst patterns (WEDGE-A, WEDGE-B, WEDGE-C, WEDGE-D) are recorded for detecting detailed position on the track, removing the above-described uncertainty of the CYLID, and making definite which of the adjacent tracks the head is positioned over. Each burst pattern comprises a burst pattern having a width of one track pitch making a cycle of two tracks, and is recorded in a position so that the recording position in the radial direction differs by half of a track pitch at a time.

When head 2 passes over a track with the above configuration, the CYLID, SECCNT, WEDGE-A, WEDGE-B, WEDGE-C, and WEDGE-D signals appear in this order in the head 2 read output signals. The reproduced levels of these burst patterns WEDGE-A, WEDGE-B, WEDGE-C, and WEDGE-D vary according to the position of head 2.

The channel 5 includes an AD converter (ADC) 5a, which successively digitizes the burst pattern signals (WEDGE-A, WEDGE-B, WEDGE-C, and WEDGE-D), and outputs data (A, B, C, D) indicating the levels of the burst patterns.

MPU 12 controls the input and output of commands and data between the disk drive and an external device. MPU 12 also controls the read and write operations (sector access operations) for the magnetic disk 1, and other functions by executing a control program recorded in, for example, the ROM 13.

HDC 20 comprises a servo control unit 21 that executes processing to generate control signals for the channel 5, searches for servo patterns, generates CYLIDs from reproduced Gray code output, etc.; a serial I/O (SIO) 22 that executes processing for conversion between parallel data and serial data etc.; a servo assist (referred to below as a servo control assist or servo assist unit) 23 that has registers (ADC REG) 17 in which, among other things, data A, B, C, D indicating the reproduced levels of the servo patterns are stored, and performs calculations of servo data according to the data A, B, C, D stored in these ADC registers 17; an SPAM 24 for carrying out, among other things, the passing of data among servo assist unit 23, MPU 12, etc.; a drive control unit (DC) 25 executes processing for drive control etc. and is in turn controlled by MPU 12; and an interrupt generator 26 that generates interrupts directed toward MPU 12.

When furnished with data A, B, C, D indicating the reproduced levels of the servo patterns from ADC 5a as described above, servo control (SC) 21 stores the data in the ADC registers 17 of the servo assist 23, and instructs servo assist 23 to commence calculation.

The servo control 21 also generates state signals for assessing conditions that make interrupt processing necessary, and supplies them to interrupt generator 26 mentioned above. The following describes the states identified by the state signals.

SECTOR COUNT

The Sector Count signal indicates that the sector count value (SECCNT) in the servo pattern is identical to a preset value. This signal generates an interrupt for processing required only for a specific servo pattern.

SSM NOT FOUND

The SSM not Found signal indicates that the special pattern (SERVO START MARK: SSM) disposed at the beginning of a servo pattern was not found.

When the servo start mark is not found during the writing of user data, processing is suspended. However, when the servo start mark is not found during a read operation, processing continues as if the servo start mark had been found.

GRAY MISREAD

The Gray Misread signal indicates that the head has departed from the target track. The cylinder ID in the servo pattern uses Gray-code notation, and read errors of one track from the target track are allowed in track following mode, but a parity-bit check is carried out at the same time, and if it is decided through this check that the head is not on the target track, a Gray misread occurs.

The subsequent processing differs, depending on the condition indicated by the above state signals, so the individual states of these state signals are stored, as described below, and are referred to by MPU 12 when it executes interrupt processing.

Serial I/O 22 converts between (parallel) data for MPU 12 and (serial) data for the channel 5, or converts servo data (DACOUT, parallel) from servo assist 23 or MPU 12 to serial data for supply to the digital-to-analog converter (DAC) in the VCM driving unit 6.

Serial I/O 22 is shared in this way in this disk drive device to reduce the cost of the device, because the frequency of servo output and of input and output of data to the channel 5 is comparatively low. To share the serial I/O 22 in this way, contention control of the processing of data between MPU 12 and channel 5 and the processing of data supplied from servo assist 23 and MPU 12 to the DAC in the VCM driving unit 6 is carried out in serial I/O 22.

SRAM 24 has, for example, a capacity of 128 bytes (16 bits×64 words); it is employed for storage of various types of coefficients, or as a work area for calculations, as well as for the passing of data.

Drive control 25 executes drive control processing, such as reading and writing data on the magnetic disk 1, under control of MPU 12. Drive control 25 also generates state signals for assessing conditions requiring interrupt processing, and supplies them to the above-mentioned interrupt generator 26. The state signals specifically indicate the states shown below.

END OF TRACK

The End of Track signal indicates that the last sector of the target track has been reached. Processing such as seek control to an adjacent track, for example, may be necessary.

REASSIGN

The Reassign signal indicates that there is an unrecoverable error in the next sector to be processed, and it has been moved (reassigned) to another location. Seek control for the reassigned track is necessary.

DRIVE COMP

The Drive Comp signal indicates that all reading and writing of user data requested by the command has been completed, and the next command can be processed. Seek control etc. for a new target track is necessary if a next command has been specified.

DRIVE CATCH

The Drive Catch signal indicates that the processing of the disk drive device has been forced to wait because of the slow processing speed of the personal computer or other host device. A latency of one revolution occurs on the media, and the media processing command must be reissued.

DRIVE ERROR

The Drive Error signal indicates that an error was detected during the reading or writing of user data. The following conditions cause a drive error signal to be generated.

The error was unrecoverable by error check and error correction (ECC).

In data read operations, the data supplied from channel 5 is temporarily stored in RAM 14. The data are then read sequentially from RAM 14 and supplied to the host device. Parity bits (ECC) for correcting errors are attached to the data. If an error is detected from the parity bits, MPU 12 carries out error correction on the data stored in RAM 14. If it cannot repair the data by this type of error correction, it requests an interrupt.

An error signal was received from AE 4 or channel 5.

AE 4 and channel 5 are adapted to output error signals when an error occurs during a read or write operation. When these error signals are supplied, it is necessary to perform processing such as halting read or write operations.

The start marker of the user data could not be found.

In read operations, the body of the user data is detected after the start marker of the data has been detected. Accordingly, the data cannot be reproduced if the start marker cannot be detected. In this case it is necessary to reread the data.

The acceleration sensor detected a shock applied to the HDD.

Drive control 25 monitors the output of the above-mentioned acceleration sensor 7; when acceleration exceeding a certain criterion is detected, it is necessary to halt read and write operations.

When an error such as the above occurs, processing of read and write operations is halted, and an interrupt of MPU 12 is requested, because it is necessary to execute the media processing command again after one revolution.

It is necessary for MPU 12 to carry out some type of processing for all of the conditions corresponding to the above state signals, so as described below, they are stored as one signal, which is referred to by MPU 12 during interrupt processing.

While MPU 12 operates according to a program, servo assist unit 23 operates according to a preset hardware sequence. Servo assist unit 23 can therefore operate faster than MPU 12, although it is specialized for calculations for servo control. Servo assist unit 23 can also operate independently after certain parameters have been set by MPU 12 or another unit, and does not increase the processing load of MPU 12 or other unit very much.

Servo assist unit 23 can be implemented as part of HDC 20, and HDC 20 is provided on control IC 10, as described above. The number of terminals for performing external input and output of signals can therefore be reduced while maintaining the same number of interconnections between servo assist unit 23, MPU 12, servo control unit 21, etc. This can facilitate reducing the chip package size and device size.

Figure 4:
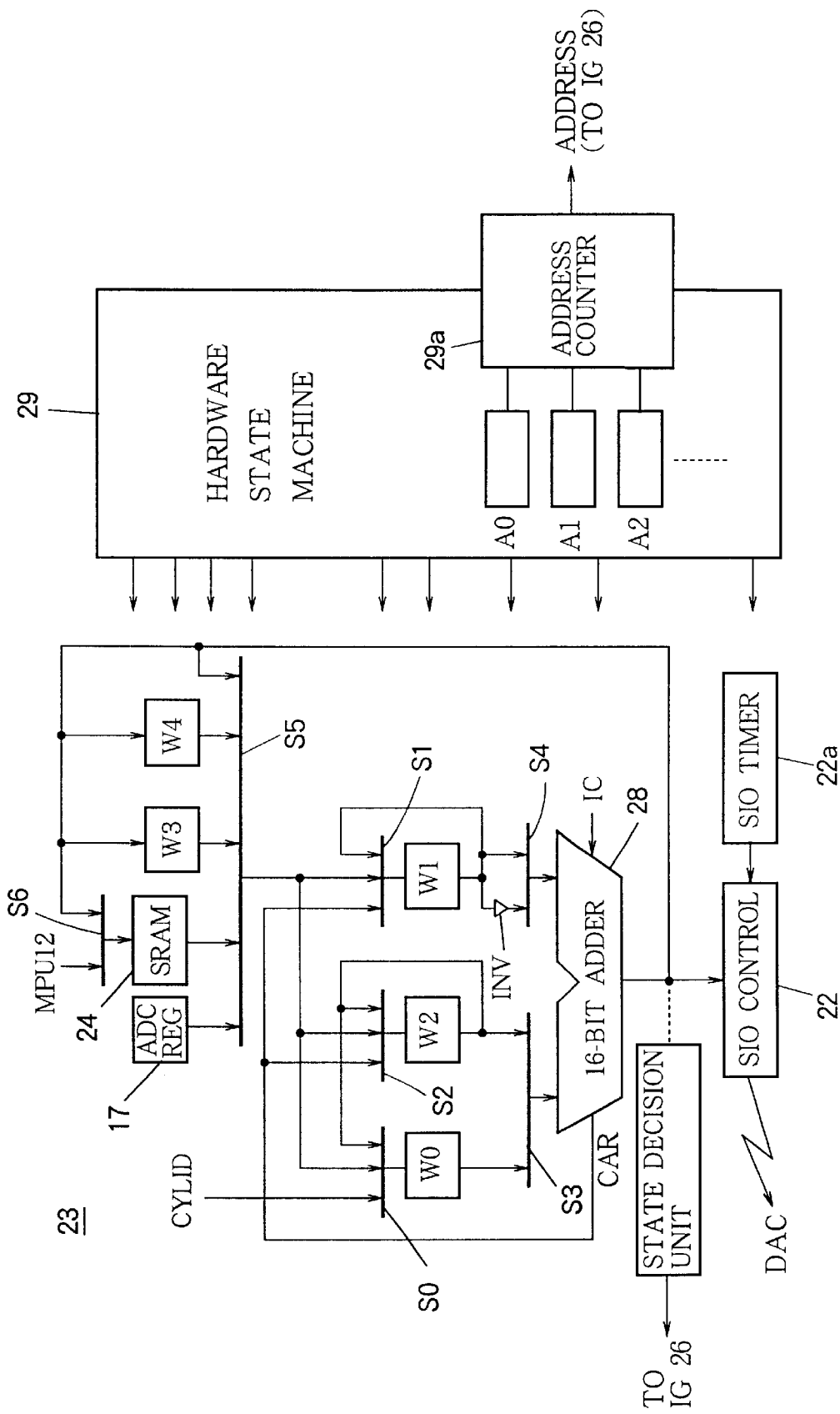
FIG. 4 illustrates a block diagram of a servo assist (SA) unit in a disk drive device according to an embodiment of the present invention.

FIG. 4 illustrates a block diagram of a servo assist unit 23. Servo assist unit 23 comprises registers W0 to W4 for storing data temporarily, selectors S0 to S6 for selecting the data and performing data manipulations such as inverting and shifting, a 16-bit adder 28 for adding two 16-bit data values, a serial I/O timer 22a for controlling serial I/O 22 output timing, and a hardware state machine (SM) 29 for controlling the entire servo assist unit 23.

Providing a servo assist unit 23 for performing calculations for servo control that were conventionally carried out by MPU 12 reduces MPU 12 calculation load, allowing MPU 12 to handle other processing tasks. Servo assist unit 23 accordingly improves disk drive performance.

State machine 29 sets data in registers W0 to W4 and controls the switching of selectors S0 to S5, following a predetermined procedure. For example, state machine 29, has a seven-bit address, determined by an address counter, attached to each control sequence.

Adder 28 is an ordinary binary adder having an initial carry input (IC) and a carry output (CAR); it performs a single addition, such as W0=W0+W1, for example, in 50 ns.

Selector S5 is supplied with the outputs of ADC registers 17 and SRAM 24, shown in FIG. 1 above, and of registers W3 and W4 and adder 28 in FIG. 4; the output of selector S5 is supplied to selectors S0, S1, and S2. The output of adder 28 is also supplied to selector S6 and registers W3 and W4. Under control from state machine 29, selector S6 selects, and supplies to SRAM 24, data from MPU 12 in FIG. 1 above, and the output of adder 28. Selector S0 is supplied with the output of selector S5, the CYLID from channel 5 in FIG. 1, and the output of register W2; the output of selector S0 is supplied to register W0. Selector S1 is supplied with the output of selector S5, the carry output CAR of adder 28, and the output of register W1; the output of selector S1 is supplied to register W1. Selector S2 is supplied with the output of selector S5, the carry output CAR of adder 28, and the output of register W2; the output of selector S2 is supplied to register W2.

The outputs of registers W0 and W2 are supplied to selector S3. Under control from state machine 29, selector S3 selects one of the outputs of registers W0 and W2 and supplies it to one input of adder 28. Furthermore, the output of register W1 is supplied to selector S1, an inverter INV, and selector S4. This selector S4 is also supplied with the output of the inverter INV; responding to control from state machine 29, it selects either the output of register W1 or the output of the inverter INV, which inverts this output, and supplies the selected output to the other input of the adder 28.

The output of the adder 28 is supplied to the serial I/O 22 in FIG. 1 above, and is supplied as data in serial form to the DAC under the control of serial I/O timer 22a.

As described above, servo assist unit 23 comprises an adder 28, several registers W0 to W4, selectors S0 to S6, etc.

Servo assist unit 23 performs calculations for servo control, including filter processing and other complex calculations. State machine 29 controls the calculations according to instructions from MPU 12.

Like the above-described servo control 21 and drive control 25, servo assist unit 23 also generates state signals for assessing conditions requiring interrupt processing, and supplies them to interrupt generator 26.

The state signals specifically indicate the states shown below; details are provided below.

READ ABORT, WRITE ABORT

The Read Abort, Write Abort signal indicates that a read or write operation was inhibited (aborted) for a reason such as that the range of the position error or velocity, assessed as described below, exceeded preset range criteria.

PREDICTION ABORT

The Prediction Abort signal indicates that a read operation was inhibited because the head position prediction was found to exceed a criterion value. Head position predictions are carried out as described below when servo sectors are read.

SPE NOT UPDATE

When the range of the position error or velocity does not meet a criterion, the current position error (CPE), described below, is not added to the sum position error (SPE) of the position errors over a plurality of reproduced servo patterns. This is described in more detail below. The SPE not Update signal indicates that no update was carried out.

The subsequent processing differs, depending on the condition indicated by the above state signals, so the individual states of these state signals are stored, as was done for the state signals from the servo control 21 described above, and MPU 12 refers to them to process interrupts.

Figure 5:
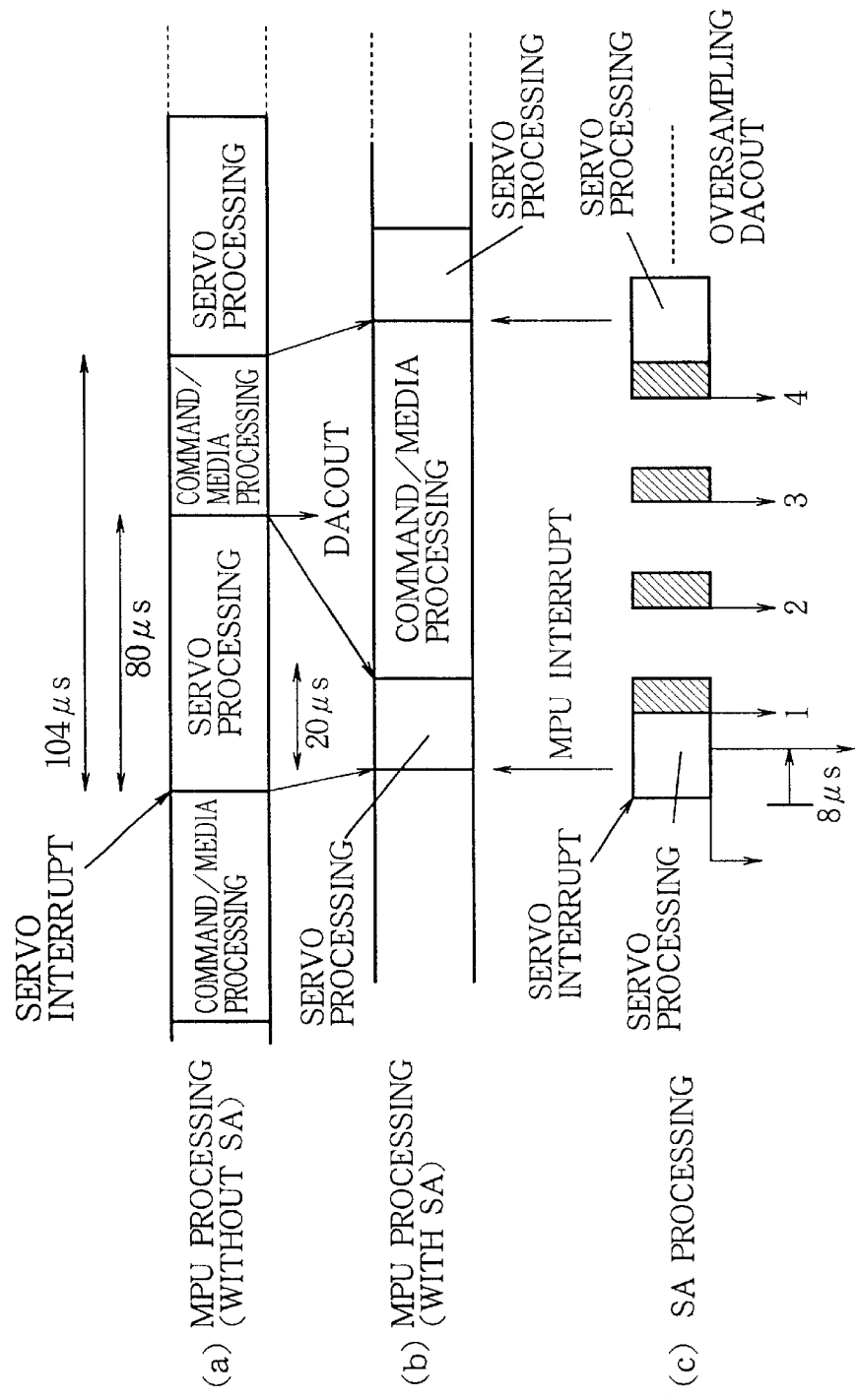
FIG. 5 illustrates a the difference in processing load of the MPU of a conventional disk drive device and a disk drive device provided with a servo assist unit.

If, for example, the rotational speed of the media is 7200 rpm, with eighty servo patterns per revolution, a servo sector is reproduced approximately every 104 $\mu$s, as shown in FIG. 5(a). In conventional disk drives where only MPU 12 provides the processing for servo control, MPU 12 is interrupted each time a servo sector is read. As a result servo control processing execution time may be, for example, 80 $\mu$s or more. Therefore, only about 20% of the total MPU 12 processing time could be used to execute processing (command/media processing) for input and output of data with an external device, media (magnetic disk 1) read/write control, and the like.

The inventors of the present invention proposed, in Japanese Patent Application No. 9-218641 filed previously, a disk drive device equipped with a hardware sequencer that executes servo data calculations, but the hardware sequencer described in that patent application is specialized for the servo data calculations. That hardware sequencer cannot determine whether or not to execute exception processing such as inhibiting reading and writing when off-track. The HDC described in the referenced patent application also has other units besides the hardware sequencer, such as a drive control unit for controlling the reading and writing data, and a servo control unit for detecting servo patterns and the like. It is also necessary to determine whether to process exceptions for these components. Therefore, even in the disk drive device in the referenced patent application, MPU 12 is interrupted when each servo pattern is read, to determine whether to process the exceptions.

Servo assist unit 23 could therefore reduce the processing load of MPU 12 by executing calculations for servo control independently of the MPU, but as shown in FIG. 5(b), it was still necessary to have MPU 12 execute interrupt processing with an execution time of about 20 $\mu$s each time a servo pattern is read.

Therefore, if the magnetic disk X1 rotation speed is increased to increase the read and write speeds, or if the number of servo areas X3 is increased to improve servo control accuracy, this increases the frequency of reading servo sectors. Hence, the frequency of interrupts increases, and the processing overhead for determining exception processing becomes large in relation to the total MPU processing. To increase the processing time assigned to command/media processing and the like, the time for determining whether exception processing is necessary cannot be ignored.

In seek operations, when head 2 is being moved, as each servo sector is read, it is necessary to generate an interrupt and assess the conditions for interrupt processing. For example, in track following control, when head 2 is being made to follow the target track, the position of head 2 and other conditions are more stable than during seek operations, and the necessary frequency of exception processing is very low. It is therefore inefficient to generate an interrupt at each servo pattern; this only increases the processing load of MPU 12 by increasing the overhead for interrupt processing.

Disk drive devices according to a preferred embodiment of the present invention are therefore configured so that servo control 21, servo assist unit 23, and drive control 25 output the above-described state signals indicating conditions such as processing completion, or errors, exceptions, and the like, as described above, and interrupt generator 26 can generate individual interrupt requests on the basis of the state signals, depending on the setting of the value of an interrupt control input INTSKIP.

Figure 6:
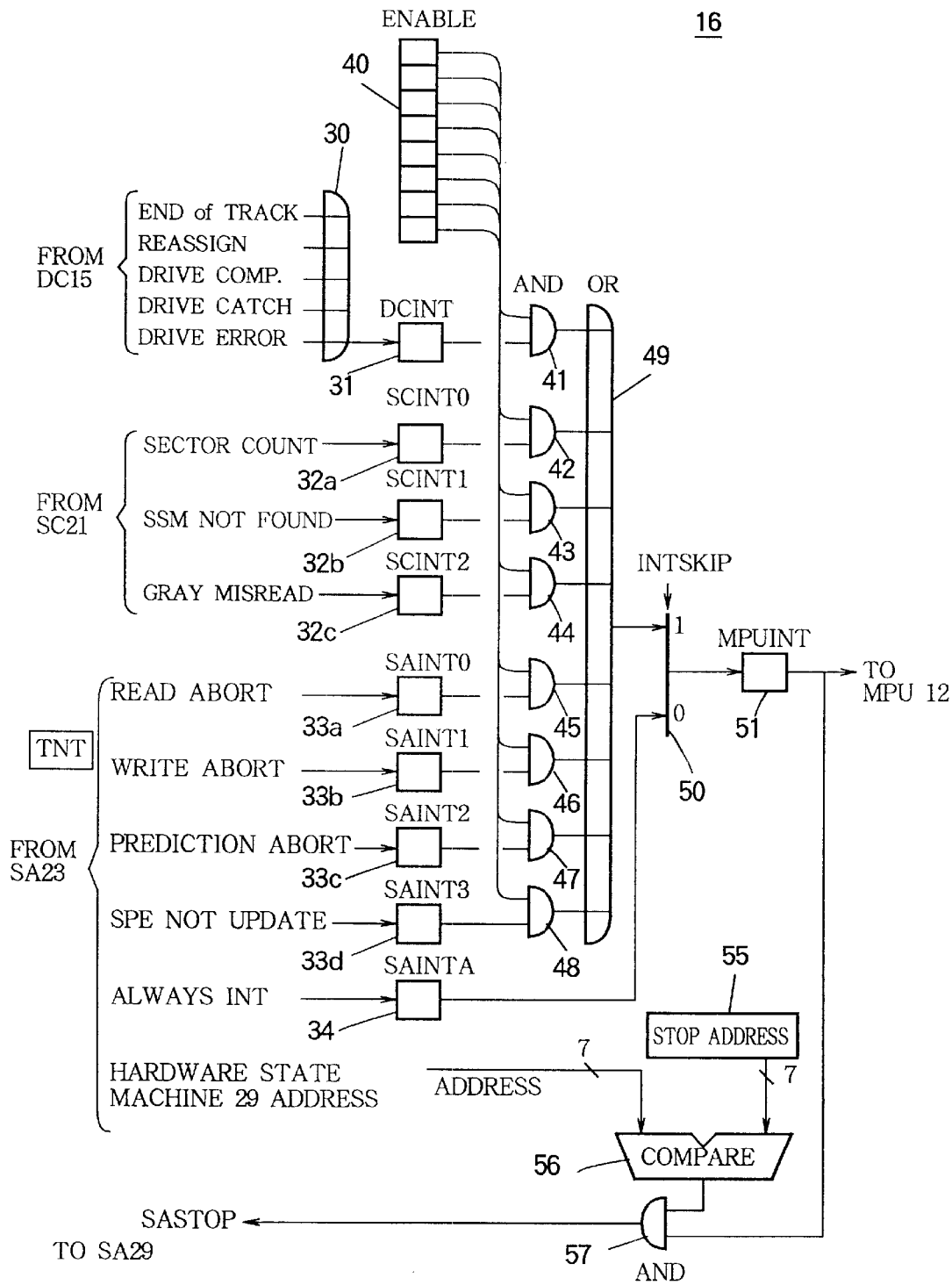
FIG. 6 illustrates a block diagram of an interrupt generator (IG) in a disk drive device according to the present invention.

FIG. 6 illustrates a block diagram of interrupt generator 26. Interrupt generator 26 comprises an OR gate 30 to which receives the state signals from drive control unit 25, a latch 31 to hold the output of OR gate 30, latches 32a, 32b, 32c to latch the stage signals from servo control unit 21, latches 33a, 33b, 33c, 33d to latch the state signals from servo assist unit 23, described below, and a latch 34 to latch an interrupt request provided by servo assist unit 23 each time a servo sector is read.

Interrupt generator 26 also comprises an enable latch 40 for holding settings specifying whether or not to generate interrupt requests from the above-described state signals; AND gates 41 to 48 that take the logical AND of the appropriate bits in enable latch 40 and the corresponding latches 21, 32a to 32c, and 33a to 33d; an OR gate 49 that takes the logical OR of the outputs of AND gates 41 to 48; a selector 50 that selectively outputs either the interrupt requests supplied through latch 34 each time a servo sector is read, or the interrupt requests from OR gate 49, according to the interrupt control input (INTSKIP) from MPU 12, servo assist unit 23, etc.; and a latch 51 that holds the output of selector 50.

When the interrupt control input INTSKIP is '0,' the interrupt requests made when each servo sector is reproduced are supplied as interrupt requests to MPU 12; conversely, when the interrupt control input INTSKIP is '1,' the interrupt requests for individual conditions from OR gate 49 are supplied as interrupt requests to MPU 12.

As described above, interrupt generator 26 can provide interrupt requests to MPU 12 when each servo pattern is reproduced, or when individual conditions occur, based on the value of the interrupt control input INTSKIP. Changing a corresponding bit of enable latch 40 can also be used to determine whether to generate interrupts based on conditions defined by the state signals from servo control 21, servo assist unit 23, and drive control 25. This provides a high degree of flexibility in controlling interrupt requests to enhance performance. For example, in the track-following mode (more specifically, during the interval from the start of the track-following mode until seek control starts due to the next command or the like), interrupt requests can be generated for each condition, so to avoid generating unnecessary interrupts at each servo pattern in track following mode. This reduces the MPU 12 processing load, and increases the MPU 12 throughput for processing other commands. This in turn improves the disk drive response time which is an important disk drive performance parameter.

To further reduce the processing load of MPU 12, servo assist unit 23 can set enable latch 40 and the value of the interrupt control input INTSKIP according to the operating mode, for MPU 12. MPU 12 reads the values held in the latches. When an interrupt is requested, MPU 12 can thereby determine the cause of the interrupt based on the values of the latches, and initiate the appropriate response to the interrupt.

Interrupt generator 26 also comprises a register 55 that stores a certain breakpoint (stop address), a comparator 56 that compares the address stored in register 55 and the address of the above-mentioned address counter of state machine 29, and an AND gate 57 that takes the logical AND of the output of comparator 56 and the output (interrupt request output) of the latch 51, and outputs the result as a stop command (SASTOP) to stop the operation of servo assist unit 23. For certain conditions indicated by the states of the above-mentioned state signals, it is advantageous to stop servo assist unit 23 processing operations and enable MPU 12 to perform the subsequent processing. Towards this end, interrupt generator 26 is configured so that when it has supplied an interrupt request to MPU 12, it can stop servo assist unit 23 processing operations at a certain breakpoint preset in register 55.

For example, when MPU 12 has not set a breakpoint in register 55, the output of comparator 56 is always '0,' so even when an interrupt of MPU 12 is requested, the output of AND gate 57 remains '0' and the operation of servo assist unit 23 is not stopped.

Conversely, when MPU 12 has set a breakpoint in register 55, if the address counter address in state machine 29 matches the breakpoint, the output of comparator 56 becomes '1.' Accordingly, when an interrupt of MPU 12 is requested and the other input of AND gate 57 becomes '1,' the operation of servo assist unit 23 is stopped at the breakpoint.

Interrupt generator 26 is also adapted so that, after servo assist unit 23 processing parameters have been changed, the stop command SASTOP can be cleared, causing processing to continue, if this is made necessary by the processing of MPU 12.

Like servo control 21, servo assist 23, drive control 25, etc. described above, interrupt generator 26 is also implemented as part of HDC 20 in control IC 10. The number of external input and output pins can thereby be reduced while maintaining the same number of interconnecting lines for supplying the interrupt requests supplied from the servo control 21, servo assist 23, and drive control 25 to interrupt generator 26. This reduces the chip package size and device size.

In operation, when a disk drive device configured as described above is given a logical block address (LBA) from an external device and commanded to perform a read or write operation, a target track, target sector, etc. are determined from the given LBA. When the target track has been determined, HDC 20 first accelerates head 2 toward the target sector. Next, when head 2 reaches a certain velocity, head 2 is moved at a constant velocity (the mode in which these velocity control operations are performed is referred to as the velocity control mode below). Moreover, when head 2 reaches the vicinity of the target sector, head 2 is decelerated (the mode in which this type of control is performed is referred to below as the settling mode). Furthermore, when head 2 reaches the target track, the head follows the target track (the mode in which this type of control is performed is referred to below as track following mode).

SERVO ASSIST UNIT OPERATION

The following describes the detailed operation of servo assist unit 23. Servo control unit 21 instructs servo assist unit 23 to start calculating when data A, B, C, D, described above, corresponding to the servo pattern signals, have been supplied through servo control unit 21 to ADC registers 17. Servo assist unit 23 determines positional error information PES, from the CYLID supplied from channel 5 through servo control unit 21 and data A, B, C, D stored in ADC registers 17.

Figure 8:
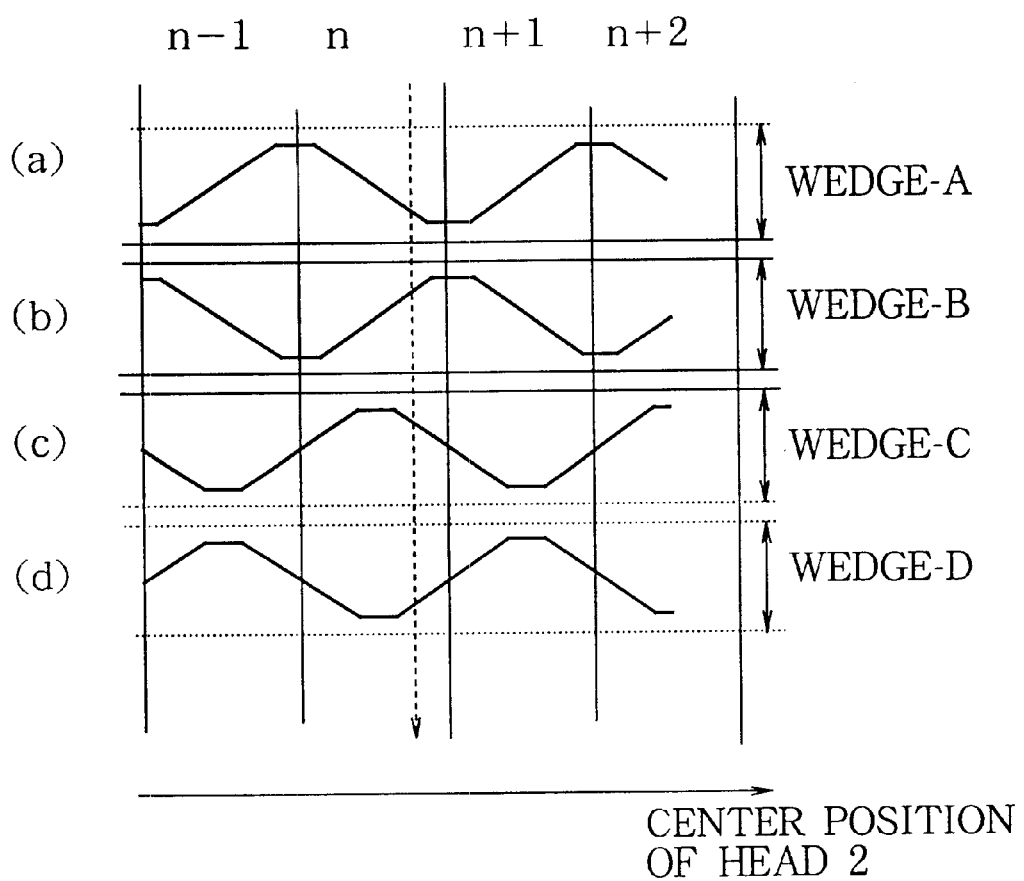
FIG. 8 illustrates the relationship between the position of the magnetic head in the radial direction and the servo pattern read signal levels.

FIG. 8 shows the variations of the burst pattern levels read when the center position of head 2 shifts from an edge of track n−1 to an edge of track n+2. When the position of head 2 is within a certain range, the read level of each burst pattern varies linearly according to the position of head 2. Furthermore, the sum of the read signal level of WEDGE-A and of WEDGE-B, and the sum of the read signal levels of WEDGE-C and of WEDGE-D, are substantially constant. An in-track position error signal (PES) can therefore be detected by using the data A, B, C, D indicating the levels of the reproduced outputs of these burst patterns.

There is a master PES (MPES) that uses data A and B indicating the read signal levels of the above-mentioned WEDGE-A and WEDGE-B, and a slave PES (SPES) that uses data C and D indicating the read signal levels of the above-mentioned WEDGE-C and WEDGE-D; these are determined from the following formulas:

$$MPES = \frac{A-B}{A+B} \times H + 80h \quad (1)$$
$$= \frac{2A}{A+B} \times H + 80h - H$$

$$SPES = \frac{C-D}{C+D} \times H + 80h \quad (2)$$
$$= \frac{2C}{C+D} \times H + 80h - H$$

Where 00h≦A, B, C, D≦FFh; and H is a head coefficient (00h≦H≦7Fh, near 7F). The ranges of values of MPES and SPES are both from 01h to FFh, inclusive.

When head 2 passes over the center of track n, the read signal levels of WEDGE-A and WEDGE-B become equal, so 2A/(A+B) becomes '1,' and MPES becomes 80h. When head 2 deviates downward in FIG. 3 from the center of track n, and passes only over WEDGE-B, without passing over WEDGE-A: A becomes 0; 2A/(A+B) becomes 0; and MPES becomes 0h. Conversely, when head 2 deviates upward in FIG. 3 from the center of track n and passes only over WEDGE-A without passing over WEDGE-B: B becomes 0; so 2A/(A+B) becomes 2; and MPES becomes FFh (or 00h in the track with CYLID n+1).

If the servo pattern is normal, A+B and C+D are substantially constant, and their values are substantially equal.

WEDGE-D can accordingly be dispensed with, widening the data recording area, if the SPES is determined from the following equation:

$$SPES = \frac{2C}{C+D} \times H + 80h - H \quad (3)$$
$$= \frac{2C}{A+B} \times \frac{A+B}{C+D} \times H + 80 - H$$
$$= \frac{2C}{A+B} \times HS + 80 - H$$

Where, 00h≦HS≦7Fh, and HS is a head coefficient (near 7F) if C/(A+B)>1, C/(A+B) is replaced by 1.

The ranges of values of MPES and SPES are both from 01h to FFh, inclusive, but when their values are small (or large), stability is poor, for reasons such as errors in the recorded positions of the above-mentioned burst patterns. Position within the current track (CUR_POS) is therefore calculated by selecting whichever of MPES and SPES has an intermediate value (for example, from 40h to C0h). The CYLID of the current track is also made definite from the values of MPES and SPES, and is made the current track (CUR_CYL). These calculations of the current track (CUR_CYL) and the current position in the current track (CUR_POS) are carried out according to the table shown in FIG. 9.

Figure 10:
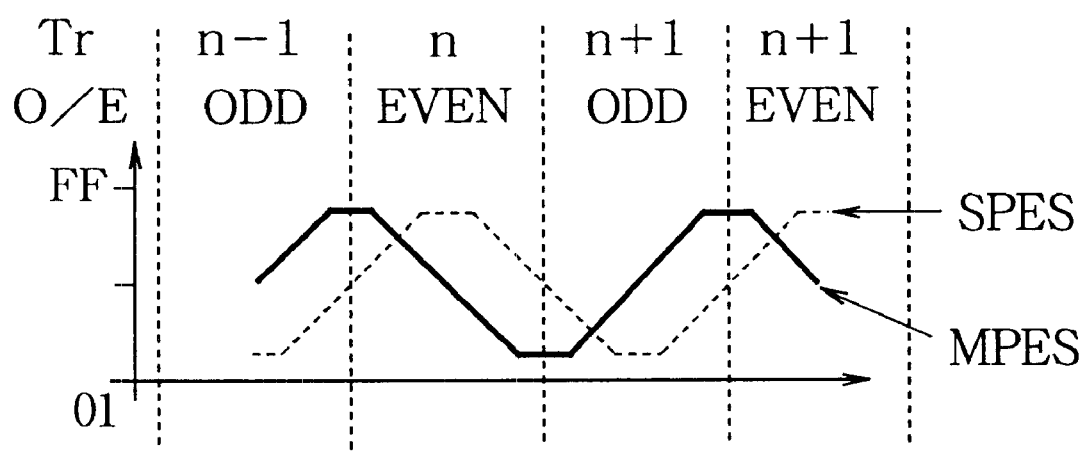
FIG. 10 illustrates variations in the position of a head in the track width direction and the position error signal in a disk drive device according to an embodiment of the present invention.
Figure 11:
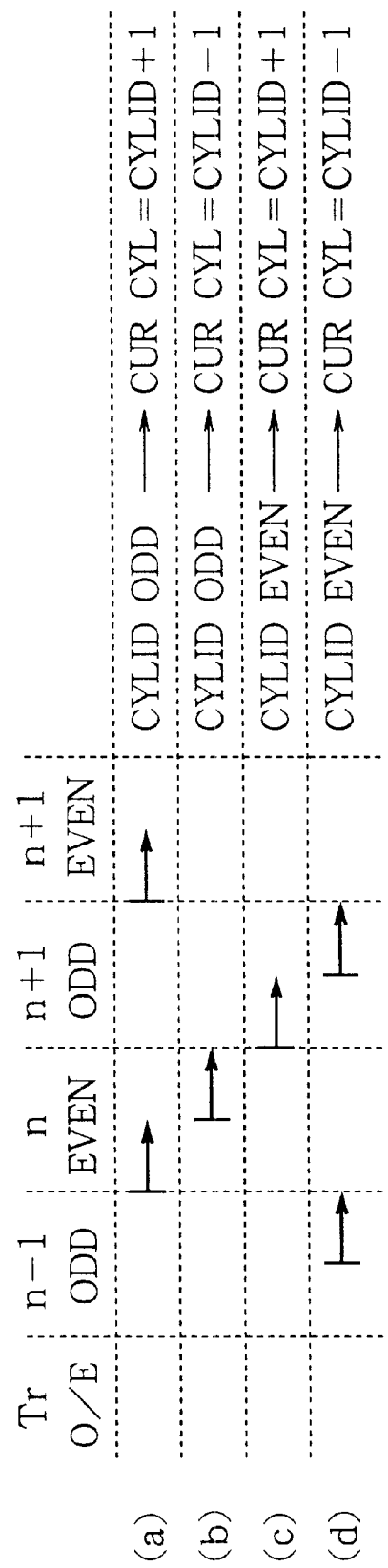
FIG. 11 illustrates the relationship between the position of a head in the track width direction and the formulas used to calculate the cylinder ID.

FIG. 10 illustrates the variations in MPES and SPES with respect to the position of head 2 in the radial direction on the magnetic disk 1; FIG. 11 illustrates the CUR_CYL determined from the table shown in FIG. 9. FIG. 12 illustrates the formulas for determining CUR_POS with respect to the position of head 2 in the radial direction of the magnetic disk 1; FIG. 13 shows the CUR_POS determined therefrom. Servo assist unit 23 defines the CUR_CYL and CUR_POS determined in this way collectively as CUR_TRK (the current track).

Servo assist unit 23 defines the track on which head 2 is to be held as TAR_TRK (the target track). Servo assist unit 23 calculates the track distance (DST) between this target track and the current track CUR_TRK, the current position error (CPE), the sum (SPE, described below) of the position errors over a plurality of servo patterns (when reproduced), the difference between the position errors between servo patterns (velocity CVE), and other parameters.

The following describes these servo assist unit 23 operations in more detail. As shown in FIG. 14, the current track CUR_TRK and target track TAR_TRK comprise a 16-bit CUR_CYL and TAR_CYL indicating the CYLID and an 8-bit CUR_POS and TAR_POS indicating position in the track. The difference between the current track CUR_TRK and target track TAR_TRK accordingly comprises 24 bits (D0, D1, D2), as shown in FIG. 14.

Servo assist unit 23 takes the absolute value of the upper 16 bits (D2, D1) of the difference between the current track and the target track, that is, the difference between the track numbers (CYLIDs) of the current track and the target track, as the track distance DST. Servo assist unit 23 also takes the lower 16 bits of the difference (D1, D0), comprising the lower eight bits of the difference between the track numbers (CYLIDS) of the current track and target track and the difference in position within the track, as the current position error CPE. The range of values of current position error CPE is from 8000h to 7FFFh. Servo assist unit 23 further takes the absolute value of the current position error (CPE) as an absolute position error (APE).

Servo assist unit 23 calculates the track distance DST, current position error CPE, and absolute position error APE when each servo pattern is read. Servo assist unit 23 also stores at least the position error CPE, and determines the sum of the position errors SPE (deviation sum) when a plurality of servo patterns are reproduced, and the current velocity CVE which is the difference between the position errors between servo patterns. Servo assist unit 23 then determines the absolute value (absolute velocity AVE) of velocity CVE.

Figure 15:
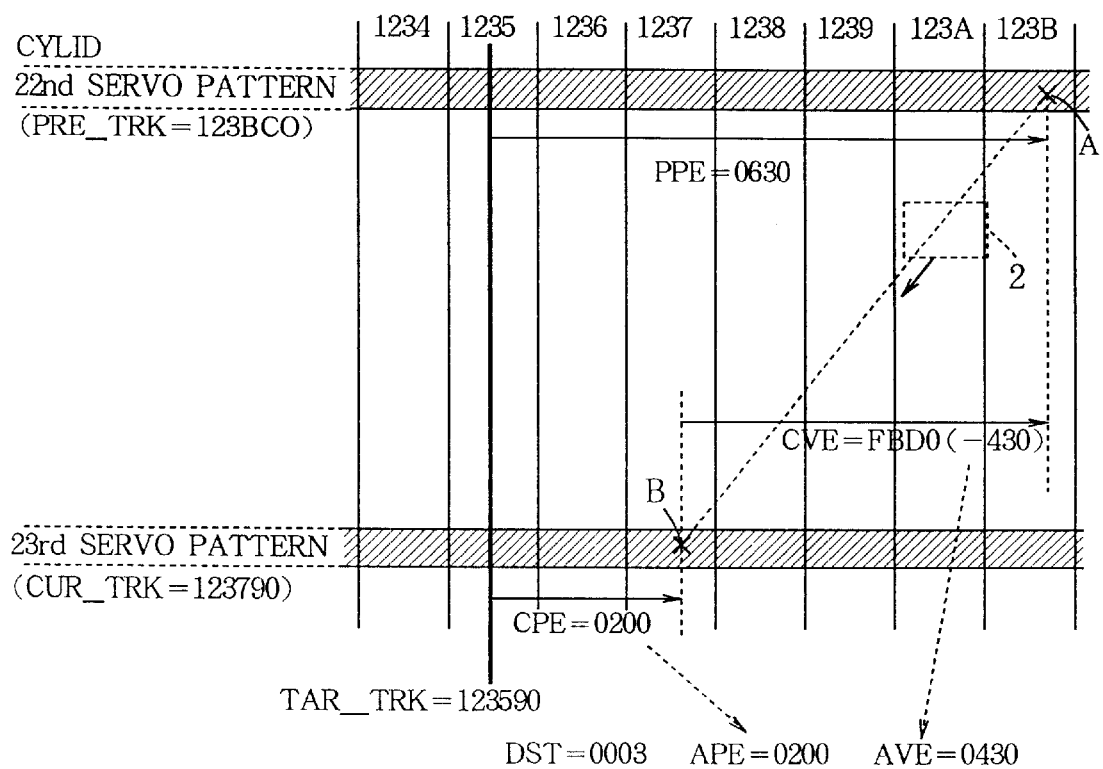
FIG. 15 illustrates a calculation of head velocity.

As an example, the following describes the case in which, in moving to track 1235h, head 2 moves from position A over the twenty-second servo pattern to position B over the twenty-third servo pattern, as shown in FIG. 15. When the head is in position B, the track distance DST is 0003h. The position error CPE when the head is in position B is 0200h, and the previous position error PPE), which is the position error CPE when head 2 was in position A, is 0630h. The absolute position error APE is accordingly 0200h. The velocity CVE is the difference between these position errors CPE, namely −430h, since 0200h−0630h=FDD0h. The absolute velocity AVE is accordingly 0430h.

Upon calculating parameters as above, servo assist unit 23 carries out such processes as selection of the operating mode, position error prediction, write inhibit control, cylinder ID inference processing, and calculation of the sum of the positional position errors (SPE) according to these parameters. The following describes these processes in more detail.

Operating Mode Selection

Figure 7:
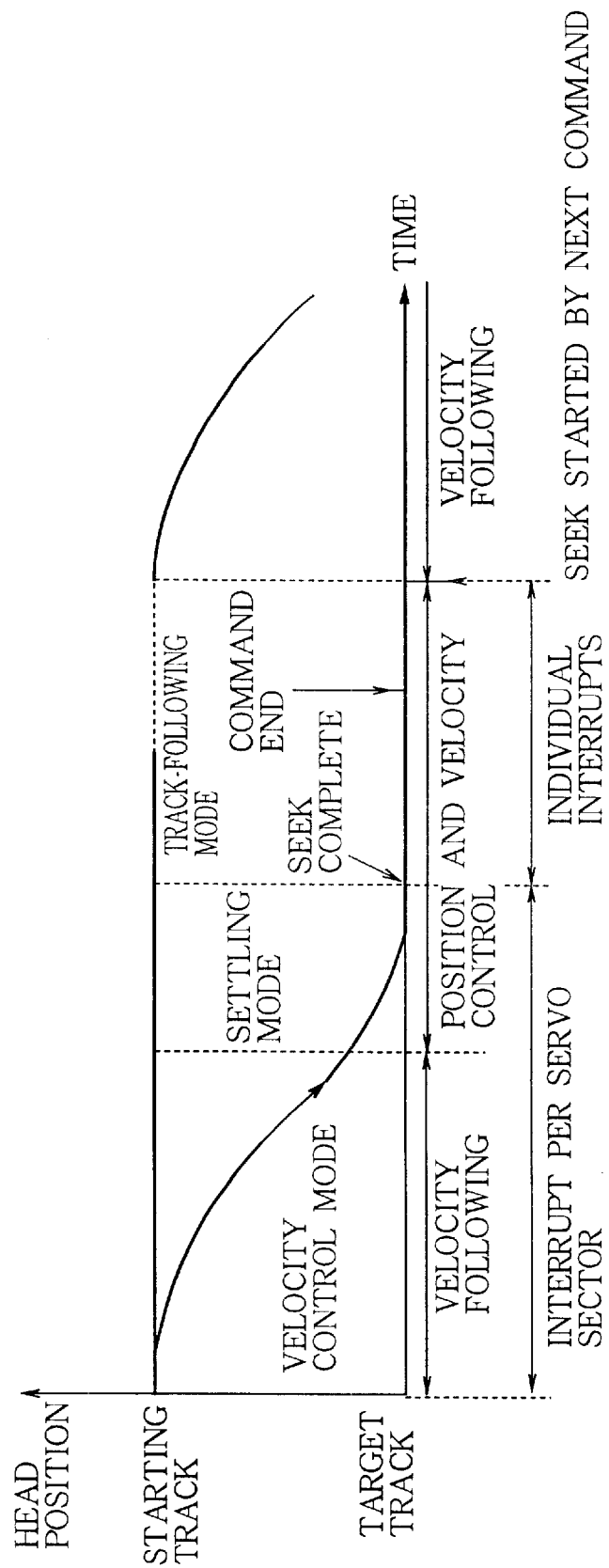
FIG. 7 illustrates the operating modes in a seek operation.

It is necessary to optimize control according to the position error (CPE, APE) between the position of head 2 and the target track, and the velocity (CVE, AVE). Specifically, as shown in FIG. 7 above, when a target track is indicated, first, head 2 is accelerated toward the target sector. When head 2 reaches a certain velocity, a switchover is made to the above-described velocity control mode to move head 2 at a constant velocity. Next, when head 2 reaches the vicinity of the target sector, a switchover is made to settling mode to decelerate head 2. Furthermore, when head 2 reaches the target track, a switchover is made to track following mode to make the head follow the target track.

Figure 16:
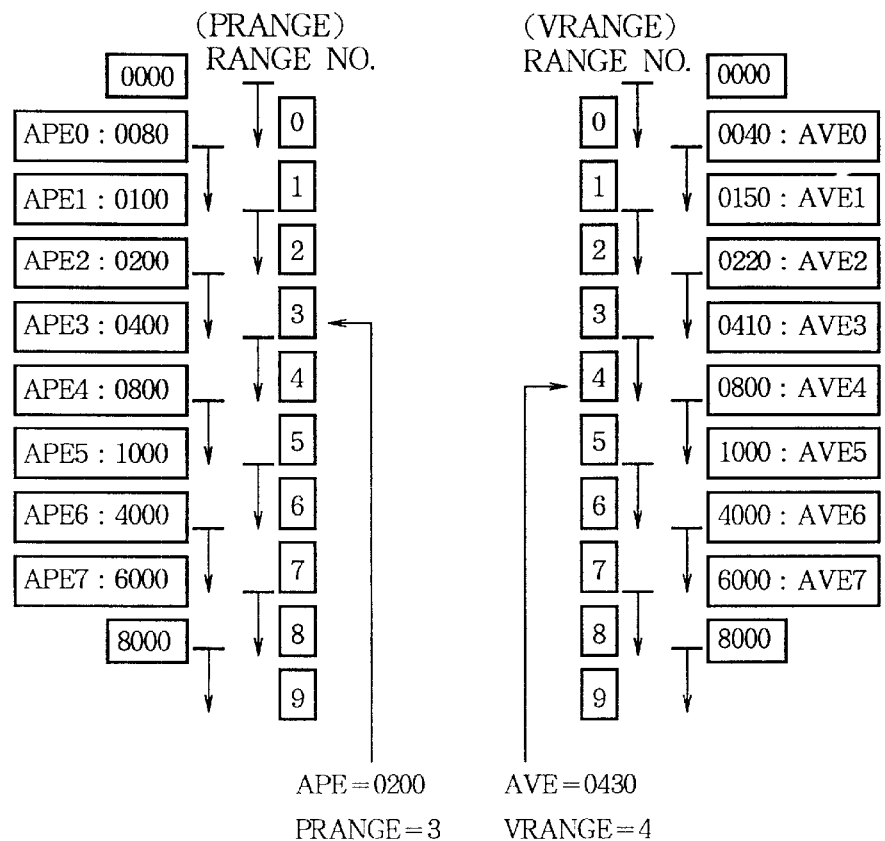
FIG. 16 illustrates a process of calculating range numbers.

The absolute position error APE and absolute velocity AVE are used to determine when to switch between these modes. As shown in FIG. 16, the possible values of the absolute position error APE and absolute velocity AVE are divided into nine ranges, and parameters APE0 to APE7 and AVE0 to AVE7 are set to indicate the boundaries of these ranges. These range parameters are set so as to satisfy APE0<APE1<APE2<APE3<APE4<APE5<APE6<APE7 and
AVE0<AVE1<AVE2<AVE3<AVE4<AVE5<AVE6<AVE7.

Servo assist unit 23 compares the absolute position error APE and absolute velocity AVE with parameters APE0 to APE7 and AVE0 to AVE7, and with 0000h and 8000h. Servo assist unit 23 decides which ranges the absolute position error APE and absolute velocity AVE fall into.

The range number (PRANGE) is '0' when the absolute position error APE is equal to or less than APE0, and '8' when it is equal to or greater than APE7. With the formulas described above, it is possible that the position error CPE may overflow 16 bits; the range number in this case is '9.' The range number (VRANGE) of the absolute velocity AVE is determined similarly.

Servo assist unit 23 carries out processing such as feedback to the VCM according to the calculated range numbers or ranges (PRANGE, VRANGE). In seek processing, for example, the absolute position error APE is large when the head is in a position distant from the target track, and small when the head is in a position near the target track. Accordingly, if the feedback value to the VCM is set to a large value when the absolute position error APE is large, and to a small value when the absolute position error APE is small, a deceleration of the head near the target track can be realized. Decelerating near the target track in this way can prevent overrun of the head which reduces the seek time and simplifies tracking acquisition.

When a mode setting such as the above is performed, servo assist unit 23 may set the interrupt control input INTSKIP in the above-mentioned selector 50. For example, in the switchover to track following mode when a seek is finished interrupt processing overhead in track following mode can be reduced and the processing load of MPU 12 can be reduced by setting the interrupt control input INTSKIP to '1.'

When a read operation is finished in track following mode, generating an interrupt at each servo sector could be considered, but until a seek is begun by the next command or the like, head 2 is simply following the track, so there is no need for urgent interrupt processing. It is therefore admissible to leave the '1' in the interrupt control input INTSKIP during the interval until a seek is begun by the next command or the like.

When a seek is begun, interrupt control input INTSKIP is set to '0' to execute interrupt processing when each servo sector is reproduced. Interrupt control input INTSKIP can be switched when MPU 12 gives the instruction for the seek due to the next command, but from the standpoint of reducing the processing load of MPU 12, servo assist unit 23 may switch control input INTSKIP when changing the mode to velocity control mode or settling mode.

By control of the value of the interrupt control input INTSKIP as described above, the MPU 12 processing load in track following mode can be reduced, the MPU 12 processing time allocated to other command processing and the like can be increased, thereby improving disk drive performance.

Record/Reproduce Inhibit Processing by Absolute Position Error and Absolute Velocity Servo assist unit 23 also determines whether to inhibit a read and write operations based on absolute position error and as absolute velocity ranges. Criteria (such as APE3 and AVE4, for example) are set for the absolute position error APE and absolute velocity AVE. Different criteria are defined for read operations and for write operations. Servo assist 23 inhibits (aborts) a read or a write operation when either the absolute position error or the absolute velocity exceeds these criteria so as to prevent reading data from or writing data to the wrong track.

When servo assist unit 23 inhibits a read operation, it sets the READ ABORT supplied to latch 33a in interrupt generator 26 to '1.' When servo assist unit 23 inhibits a write operation, it sets the WRITE ABORT supplied to latch 33b to '1.' The READ ABORT and WRITE ABORT indicate that a read operation/write operation, respectively, has been inhibited.

Position Error Prediction and Write Inhibit Processing

In the inhibit processing described above, read and write operations are inhibited based on the current position error and velocity. However, during write operations, in particular, whether to inhibit a write operation is determined based on the head 2 position when the next servo pattern is read. That is, servo assist unit 23 predicts the position error at the next servo pattern from the absolute value of CPE+CVE, and inhibits the write operation if the absolute value of this predicted value is not within a certain criterion value (PWAC), or is greater than 7FFFh.

Figure 17:
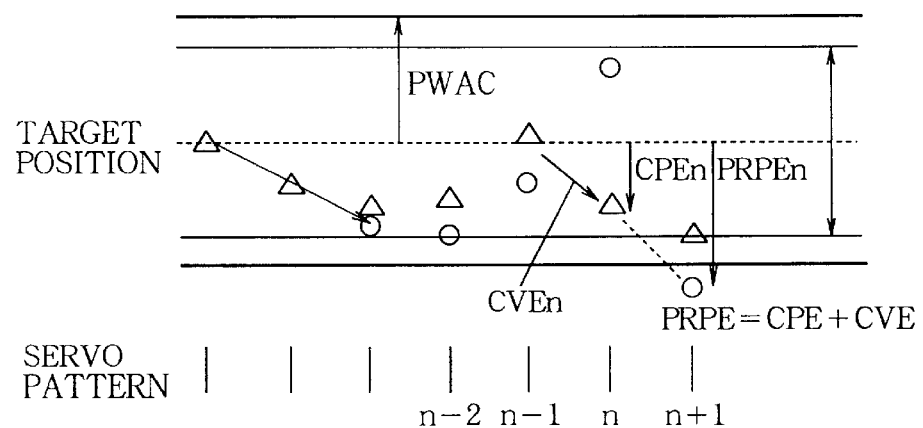
FIG. 17 illustrates a process of predicting the position error.

In these cases in which CPE+CVE>PWAC or CPE+CVE>7FFF, such as when servo pattern n in FIG. 17 is reproduced, a large position error is predicted to occur when the next servo pattern n+1 is reproduced, as indicated by the dotted line in FIG. 17, and write operations are inhibited, because it is decided that it would be inappropriate to continue writing.

A suitable value is assigned to the criterion PWAC based on the calculated current servo pattern, taking into consideration that the head position will be modified by feedback to the VCM.

When servo assist unit 23 inhibits write operations in this way, it sets the PREDICTION ABORT supplied to latch 33c in interrupt generator 26 to '1' to indicate that it has inhibited a write operation.

Cylinder ID Inference Processing

The cylinder ID (CYLID) can be obtained by reproducing the Gray code in the servo pattern as described above, but when head 2 is moving at high speed, read errors may occur even in the Gray code. If Gray code read errors are simply treated as errors, control of the head position cannot be carried out until the next servo pattern is reproduced. Therefore, in such cases servo assist unit 23 infers the cylinder ID.

Figure 18:
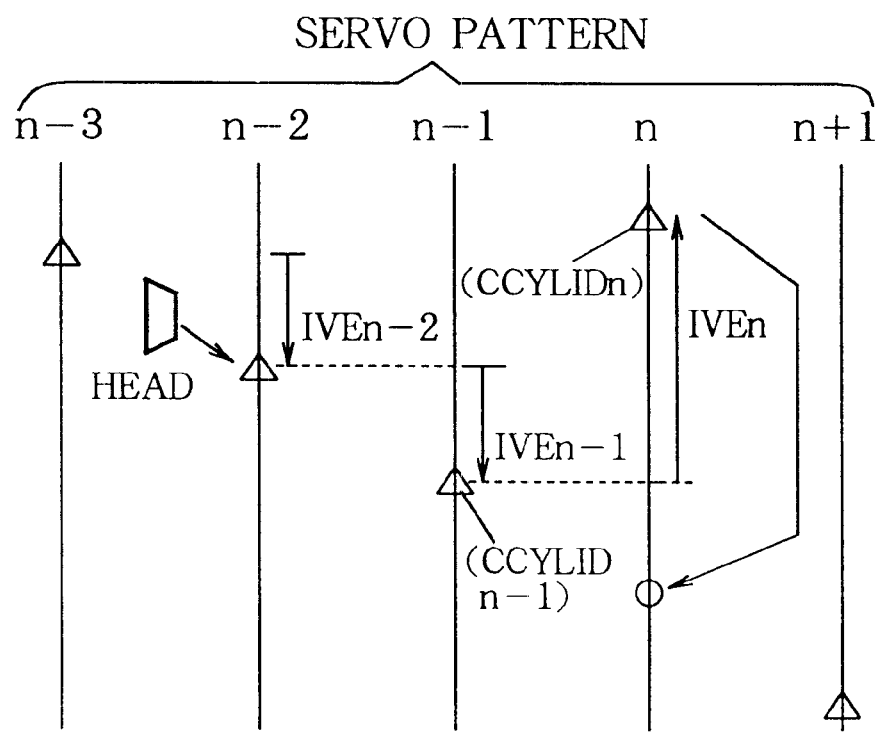
FIG. 18 illustrates a process of inferring the cylinder ID.

As shown in FIG. 18, for example, when the cylinder ID (CCYLIDn) of a certain servo pattern is obtained, servo assist 23 determines the difference IVEn (the inter-cylinder velocity) between the obtained cylinder ID and the preceding cylinder ID (CCYLIDn-1). When this inter-cylinder velocity IVEn exceeds a predetermined criterion velocity (AVC, determined according to the head velocity at which the probability that a Gray code read error will occur becomes high), servo assist 23 decides that a Gray code read error has occurred, sets the CCYLIDn in servo pattern n to (CCYLIDn-1+IVEn-1), and continues subsequent servo control. Servo control can thus continue even if cylinder ID read errors occur temporarily. This improves seek times.

Calculating the Sum (SPE) of the Positional Errors When a Plurality of Servo Patterns are Reproduced The sum of the positional errors (SPE) when the preceding servo patterns were reproduced is employed for determining the servo data for driving the VCM. Servo assist 23 sets an initial value in the position error SPE at a certain time (for example, when a particular servo pattern is reproduced), then adds the position error CPE at each servo pattern thereafter. However, servo assist 23 also decides from the above-mentioned range numbers whether or not the position error is within a position error SPE addition criterion, and adds the position error CPE only when the position error meets the criterion. Controlling the position error CPE addition in this manner reduces the effect of temporary position error increases.

If the position error CPE does not meet the SPE addition criterion then the SPE update is not carried out and servo assist 23 sets the SPE not Update signal supplied to latch 33c in interrupt generator 26 to '1' to indicate that SPE was not updated.

After completing the SPE processing, servo assist 23 determines the servo data (CNTIN) for controlling the VCM. Servo data CNTIN is a sum of the position error CPE, velocity CVE, position error sum SPE, and values calculated up to when the preceding servo pattern was read, multiplied by suitable coefficients, according to the following equations:

CNTIN=U+CENT

U=K0×CPE+K1×CVE+K2×SPE+K3×U1+K4×U2

U2=U1

$$U1=-U \qquad (4)$$

Where, Ki, OFFSET, and CENT are adjustment coefficients.

Servo assist 23 performs filter processing, oversampling processing, gain adjustment and limiting, and other processing on the servo data CNTIN determined in this way, and supplies the servo data CNTIN as DACOUT to the serial I/O 22 etc. to be fed back to the VCM. Serial I/O 22 supplies the DACOUT from servo assist 23 to the VCM control unit 6 DAC as serial data. The DAC drives the VCM based on the supplied data (DACOUT) to control the position of head 2.

Value Gain Adjustment and Limiting Processing

VCM operation is controlled by an analog applied voltage. This voltage is controlled by the VCM feedback value (DACOUT, a digital value) supplied to the VCM driver 6 DAC. This DAC is adapted to permit midway gain adjustment (high/low gain), so that the output voltage can be finely adjusted in the low voltage range. Servo assist 23 controls the DAC gain, as shown in FIG. 19(a), so that the DAC gain is high when the servo data CNTIN is in the ranges from F800h to FF00h and from 0100h to 0800h, and the DAC gain is low in the range from FF00h to 0100h. The formula for calculating the value of DACOUT is changed so that the output voltage of the DAC is not discontinuous at these switchovers. Thus the DACOUT value is discontinuous when the servo data CNTIN is FF00h and 0100h, as shown in FIG. 19(a), but the output voltage of the DAC is continuous as shown in FIG. 19(b).

There are also cases in which the output voltage characteristic of the VCM requires limiting. Servo assist 23 limits the DACOUT value when the servo data CNTIN is smaller than a lower limit value (determined according to the lower limit value of the output voltage of the DAC) or greater than an upper limit value (determined according to the upper limit value of the output voltage of the DAC). The output voltage of the DAC is thereby kept within a certain range, as shown in FIG. 19(b).

Filter Processing

The head driving system, including the head arm 3 etc., has natural vibration frequencies responsive to its structure. If the servo data (CNTIN) calculated by the above equations (4) were to be supplied unaltered to the VCM as DACOUT, the head driving system might resonate because of the natural frequency components in the servo data. It is therefore desirable to remove the natural frequency components from the servo output by means of, for example, a notch filter or the like. In the past, a distinct filter circuit, or a DSP or MPU, was provided, separate from the MPU that executed supervision of input and output of data with external devices etc., increasing the total cost of the device.

In this disk drive device, in contrast, this type of filter processing can be executed by multiplying the servo data (CNTIN) determined by servo assist 23, or the previous filter output (CNTOUT), by appropriate coefficients Ai and Bi and adding the results. Specifically, the filter output (CNTOUT) is obtained from the following equations:

U=A0×CNTIN+A1×U11+A2×U12

CNTOUT=U+B1×U11+B2×U12

U12=U11

$$U11=U \qquad (5)$$

The gain adjustment and limiting processes described above are also carried out on this filter output, and the result is supplied to the serial I/O 22 etc. as control data DACOUT for controlling VCM 6. The filter processing may be carried out several times, changing the coefficients, to form a cascaded multi-stage filter.

Resonance of the head arm 3 etc. can be prevented by performing filter processing in this way to remove the natural frequency components from the servo output. Moreover, there is only a minimal increase in MPU 12 processing load because servo assist 23 can carry out the filtering process independently of MPU 12.

Oversampling Processing:

Normally, control data DACOUT is supplied to the VCM driving unit 6 once each time one servo pattern is reproduced. In one embodiment, the servo pattern frequency, however, is about 5 kHz to 10 kHz; if left unchanged, the sound produced by head arm 3 vibration is within the human audible frequency band, and is perceived as noise.

The sound produced by head arm 3 vibration can be moved outside the audible frequency band by oversampling to output the control data (DACOUT) in a plurality of bursts (installments) per servo pattern.

In one embodiment, control data DACOUT is output by servo assist 23 four times during each interval from one servo pattern to the next. Servo assist 23 executes the processing up to the calculation of the above-mentioned servo data CNTIN only once per servo pattern, executes filter processing, and outputs the first DACOUT. Immediately afterward, servo assist 23 performs the filter processing for the second DACOUT, then waits until there is a DACOUT request from the timer that measures the DACOUT interval. When there is a DACOUT request from the timer, the already-calculated DACOUT is output. Similar processing is repeated a prescribed number of times. The DACOUT control data can be provided at intervals equal to one-fourth the servo pattern interval in this way, as shown in the above FIG. 5(c).

If output of the control data DACOUT is carried out four times within the servo pattern reproduction interval in this way (that is, with 4× oversampling), the processing done the first time, which is the most time-consuming, must end in one-fourth the servo pattern reproduction interval, or about 25 $\mu$s. It is accordingly necessary to configure servo assist 23 so as to produce this degree of computational performance.

DACOUT Output Interval Alteration Processing:

From the standpoint of mechanical characteristics, and reducing noise generated by head arm 3 vibration and the like, it is advantageous to vary the DACOUT output interval to a certain extent. If the DACOUT output interval is constant, the corresponding frequency distribution of the head arm 3 vibration has a sharp peak at a particular frequency. However, if the DACOUT output interval is varied to a certain extent, the frequency distribution of the head arm 3 vibration becomes broader and the peak becomes lower. Therefore, varying the DACOUT output interval reduces the intensity of the sound perceived as noise. Varying the DACOUT output interval also improves other mechanical characteristics, including increased durability and reduced vibration.

In operation, servo assist 23 generates random numbers from the output (CNTOUT2) of filter processing B and adds them to the initial timer setting (TIMER) at each DACOUT, as shown in FIG. 20, to determine the interval until the next DACOUT. These random numbers are generated by using the three lowest bits of CNTOUT2 to determine an absolute value and sign; their range of values is from −4 to +3. If these random numbers are added to the initial timer setting (for example, 25) when the DACOUT intervals are determined, the mean value of these intervals (21 to 28 $\mu$s) will be approximately equal to the initial timer setting.

DACOUT Supervision Processing

Defects in the servo patterns of the magnetic disk 1, abnormalities in head 2, external disturbances, and the like, can cause inaccurate CYLID readings. After an inaccurate CYLID reading, if the servo output (DACOUT) is determined in the normal manner, inappropriate values may be obtained, and control may become unstable. If the CYLID of a track distant from the target track is supplied during track following control, for example, the DACOUT value determined by servo assist 23 becomes larger than the real value. If servo control continues on the basis of this type of DACOUT value, head 2 departs from the target track and servo control becomes unstable. It then becomes necessary to perform another seek to the target track, read/write time is lengthened, and the performance of the disk drive device is degraded.

Therefore, in one embodiment servo assist 23 monitors the DACOUT value, and when the value is inappropriate, servo assist 23 sets the above-described WRITE ABORT state signal to '1' (READ ABORT if during a read operation), for example, to notify interrupt generator 26 of a condition requiring an interrupt.

In advance, as the above-mentioned breakpoint, MPU 12 supplies register 55 with an address preceding that at which the calculation of servo data by servo assist 23 ends and DACOUT is supplied to the VCM 6. As described above, during track following, interrupts of MPU 12 are requested by individual interrupt requests. Hence, if a breakpoint is set then when WRITE ABORT or READ ABORT is '1,' an interrupt of MPU 12 is requested, and servo assist 23 processing is halted at the breakpoint.

When this type of interrupt request occurs, MPU 12 determines an appropriate DACOUT value, supplies this value to the appropriate register in servo assist 23, then clears SASTOP and causes servo assist 23 to continue processing. Servo control is thereby continued on the basis of an appropriate DACOUT value. In one embodiment, during track following control, a value determined from the CYLID of the target track is used as the appropriate DACOUT value. During a seek, a value determined by using the CYLID determined by the-cylinder ID inference process described above is used.

Servo control can thus be stabilized by monitoring the DACOUT values, generating an interrupt of MPU 12 when the DACOUT value becomes inappropriate, and after MPU 12 determines an appropriate value, resuming servo control by servo assist 23 based on the appropriate value.

Alternative Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For example, the conditions under which the servo control 21, servo assist 23, and drive control 25 output state signals can be modified as necessary according to the control method. The configuration of the condition latches etc. in interrupt generator 26 shown in FIG. 6 can also be modified according to the content of the processing.

To simplify the configuration, interrupt generator 26 described above had a single enable latch 40 and a single interrupt level, but a plurality of interrupt levels may be provided, and the level at which interrupts to MPU 12 are allowed may be changed according to the operating mode (velocity control mode, settling mode, track following mode). Optimal operations can thereby be selected according to the operating mode.

Alternatively, if MPU 12 determines whether or not to execute interrupt processing based on the type of interrupt, then an interrupt of MPU 12 is requested. However, whether to execute the subsequent processing can be determined based on the type of interrupt, and adjustments in the processing load can be made according to the type of interrupt.

EFFECT OF THE INVENTION

In a disk drive device according to the present invention, an interrupt generator can perform appropriate interrupt settings on the basis of results of calculations by a servo assist unit, by generating interrupt requests to a storage controller on the basis of the results of the calculations by the servo assist unit, thereby reducing the load on the controller, and contributing to improvements in the performance of the disk drive device.

The interrupt generator can also perform settings of operating modes according to position information detected by a servo controller, and can perform settings of interrupts according to the operating mode, by selecting whether to generate interrupt requests to the storage controller when every servo sector is reproduced or to generate interrupt requests to the storage controller on the basis of the results of calculations by the servo assist unit, according to the operating mode, and can thereby reduce the load on the storage controller effectively.

What is claimed is:

1. A servo control device to control transducer positioning in a data storage device having a disk-shaped recording medium having servo areas in which servo sectors are recorded and data areas in which data sectors are recorded, a transducer, a storage controller to control data sector access operations, and a transducer actuator, comprising:

a servo controller to determine a position of said transducer from servo sector output read by said transducer;

a servo assist unit, separate from said storage controller, to compute servo data for controlling said transducer actuator based on position information extracted by the servo controller; and an interrupt generator to selectively generate interrupt requests to said storage controller as determined by results of the servo assist unit computations, wherein said interrupt generator sets an operating mode responsive to the position information detected by said servo controller and selects whether to generate an interrupt request to said storage controller when each servo sector is reproduced, or to generate interrupt requests to said storage controller as determined by results of the servo assist unit computations, responsive to the operating mode.

2. The servo control device of claim 1 wherein said servo assist unit monitors a servo output signal to detect servo data read errors and wherein an interrupt is provided to the storage controller when predetermined error conditions are detected.

3. The servo control device of claim 1 wherein said servo assist unit controls inhibition of sector access operations.

4. The servo control device of claim 3 wherein said servo assist unit predicts a transducer position error and determines whether to inhibit sector access operations based on the predicted transducer position error.

5. The servo control device of claim 1 wherein said servo assist unit infers a servo pattern data value when a servo pattern read error is detected.

6. The servo control device of claim 1 wherein said servo assist unit adds measured transducer position errors to generate a position error sum for servo control.

7. The servo control device of claim 6 wherein said servo assist unit determines whether to add a servo error to said position error sum based on predetermined position error criteria.

8. The servo control device of claim 1 wherein said servo assist unit filters transducer actuator control signals so as to remove resonant frequency control data.

9. The servo control device of claim 1 wherein said servo assist unit provides transducer actuator control signals to said transducer actuator in a plurality of bursts per servo pattern so as to reduce noise.

10. The servo control device of claim 9 wherein said servo assist unit varies an interval duration between said transducer actuator control signal bursts for a servo pattern.

11. The servo control device of claim 1 wherein said servo assist unit performs computations based on a predetermined hardware sequence.

12. A control device to control a data storage device having a disk-shaped recording medium including servo areas in which servo sectors are recorded and data areas in which data sectors are recorded, a transducer, and a transducer actuator, comprising:

a storage controller to control data sector access operations by said transducer; a servo controller to determine a position of said transducer from servo sector output read by said transducer;

a servo assist unit, separate from said storage controller, to compute servo data for controlling said transducer actuator based on position information extracted by the servo controller; and an interrupt generator to selectively generate interrupt requests to said storage controller as determined by results of the servo assist unit computations, wherein said interrupt generator sets an operating mode responsive to the position information detected by said servo controller and selects whether to generate an interrupt request to said storage controller when each servo sector is reproduced, or to generate interrupt requests to said storage controller as determined by results of the servo assist unit computations, responsive to the operating mode.

13. A data storage device, comprising:

a disk-shaped recording medium having servo areas in which servo sectors are recorded and data areas in which data sectors are recorded;

a transducer to read and write the data sectors, and to read the servo sectors on the disk-shaped recording medium;

a transducer actuator to control the position of the transducer;

a storage controller to control data sector access operations by said transducer;

a servo controller to determine a position of said transducer from the servo sector output read by said transducer;

servo assist unit, separate from said storage controller, to calculate servo data for controlling said transducer actuator based on position information extracted by the servo controller and transducer; and an interrupt generator to selectively generate interrupt requests to said storage controller as determined by results of calculations by the servo assist unit, wherein said interrupt generator sets an operating mode responsive to the position information detected by said servo controller and selects whether to generate an interrupt request to said storage controller when each servo sector is reproduced, or to generate interrupt requests to said storage controller as determined by results of the calculations by said servo assist unit, responsive to the operating mode.

14. The data storage device of claim 13, wherein at least said storage controller, said servo assist unit, and said interrupt generator are formed as a single semiconductor device.

15. A data storage device servo control method comprising the steps of:
   determining a position of said transducer from servo sector output read by said transducer;
   computing servo data using a servo assist unit, separate from a storage controller, for controlling a transducer actuator based on extracted position information;
   generating selective interrupt requests to said storage controller as determined by results of the servo assist unit computations; and
   setting an operating mode responsive to the detected position information by said servo controller and selecting whether to generate an interrupt request to said storage controller when each servo sector is reproduced, or to generate interrupt requests to said storage controller as determined by results of the calculations by said servo assist unit, responsive to the operating mode.

16. A servo control device to control transducer positioning in a data storage device having a disk-shaped recording medium having servo areas in which servo sectors are recorded and data areas in which data sectors are recorded, a transducer, a storage controller to control data sector access operations, and a transducer actuator, comprising:
   s a servo controller means for determining a position of said transducer from servo sector output read by said transducer;
   a servo assist means, separate from said storage controller, for computing servo data for controlling said transducer actuator based on position information extracted by the servo controller means; and
   an interrupt generator means for selectively generating interrupt requests to said storage controller as determined by results of the servo assist means computations, wherein said interrupt generator means sets an operating mode responsive to the position information detected by said servo controller means and selects whether to generate an interrupt request to said storage controller when each servo sector is reproduced, or to generate interrupt requests to said storage controller as determined by results of the calculations by said servo assist unit, responsive to the operating mode.

* * * * *